United States Patent
Yang et al.

(10) Patent No.: US 12,206,540 B2
(45) Date of Patent: Jan. 21, 2025

(54) METHOD AND DEVICE FOR TRANSMITTING AND RECEIVING WIRELESS SIGNALS IN WIRELESS COMMUNICATION SYSTEM

(71) Applicant: LG ELECTRONICS INC., Seoul (KR)

(72) Inventors: Suckchel Yang, Seoul (KR); Changhwan Park, Seoul (KR); Joonkui Ahn, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 802 days.

(21) Appl. No.: 17/422,132

(22) PCT Filed: Jan. 13, 2020

(86) PCT No.: PCT/KR2020/000631
§ 371 (c)(1),
(2) Date: Jul. 9, 2021

(87) PCT Pub. No.: WO2020/145801
PCT Pub. Date: Jul. 16, 2020

(65) Prior Publication Data
US 2022/0131731 A1 Apr. 28, 2022

(30) Foreign Application Priority Data
Jan. 11, 2019 (KR) .......... 10-2019-0004259

(51) Int. Cl.
*H04L 27/26* (2006.01)
*H04L 5/00* (2006.01)
(Continued)

(52) U.S. Cl.
CPC ........ *H04L 27/2613* (2013.01); *H04L 5/0051* (2013.01); *H04L 27/2605* (2013.01); *H04W 74/0816* (2013.01)

(58) Field of Classification Search
CPC .............. H04L 27/2613; H04L 5/0051; H04L 27/2605; H04W 74/0816
See application file for complete search history.

(56) References Cited

U.S. PATENT DOCUMENTS

| 2012/0063371 A1* | 3/2012 | He | ........ H04L 5/0048 370/280 |
| 2017/0238190 A1* | 8/2017 | Yang | ........ H04W 16/14 370/329 |

(Continued)

FOREIGN PATENT DOCUMENTS

| KR | 1020170108078 | 9/2017 |
| WO | 2016006979 | 1/2016 |

OTHER PUBLICATIONS

PCT International Application No. PCT/KR2020/000631, International Search Report dated May 11, 2020, 15 pages.
(Continued)

*Primary Examiner* — Muthuswamy G Manoharan
(74) *Attorney, Agent, or Firm* — LEE, HONG, DEGERMAN, KANG & WAIMEY

(57) ABSTRACT

The present invention relates to a wireless communication system, and specifically, to a method and a device for the method, the method comprising: a step for receiving SRS configuration information; a step for performing a CAP for SRS transmission for each symbol, starting from the first symbol among a plurality of symbols, on the basis of the SRS configuration information; and a step for performing an SRS transmission process on the basis of a successful CAP in the Mth symbol among the plurality of symbols, wherein the SRS transmission is performed on the Mth symbol
(Continued)

among the plurality of symbols on the basis of M being equal to or less than a reference value, and the SRS transmission is canceled even in all of the symbols after the Mth symbol among the plurality of symbols on the basis of M being greater than the reference value.

9 Claims, 19 Drawing Sheets

(51) Int. Cl.
  *H04W 74/08* (2024.01)
  *H04W 74/0816* (2024.01)

(56) References Cited

U.S. PATENT DOCUMENTS

| | | | |
|---|---|---|---|
| 2018/0027590 A1 | 1/2018 | Yerramalli et al. | |
| 2020/0221311 A1* | 7/2020 | Liu | H04L 5/0064 |
| 2021/0168853 A1* | 6/2021 | Um | H04W 72/23 |

OTHER PUBLICATIONS

Intel Corporation, "Enhancements to NR UL signals and channels for unlicensed operation," 3GPP TSG RAN WG1 Meeting #95, R1-1812481, Nov. 2018, 16 pages.

Samsung, "Uplink signal and channel design for NR-U," 3GPP TSG RAN WG1 Meeting #94, R1-1808767, Aug. 2018, 6 pages.

\* cited by examiner (a) Carrier aggregation between L-band and U-band (b) Standalone U-band(s)

METHOD AND DEVICE FOR TRANSMITTING AND RECEIVING WIRELESS SIGNALS IN WIRELESS COMMUNICATION SYSTEM

CROSS-REFERENCE TO RELATED APPLICATIONS

This application is the National Stage filing under 35 U.S.C. 371 of International Application No. PCT/KR2020/000631, filed on Jan. 13, 2020, which claims the benefit of earlier filing date and right of priority to Korean Patent Application No. 10-2019-0004259, filed on Jan. 11, 2019, the contents of which are all incorporated by reference herein in their entirety.

TECHNICAL FIELD

The present disclosure relates to a wireless communication system, and more particularly, to a method and apparatus for transmitting and receiving a wireless signal.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

Provided are a method and apparatus for efficiently performing a wireless signal transmission and reception process.

It will be appreciated by persons skilled in the art that the objects that could be achieved with the present disclosure are not limited to what has been particularly described hereinabove and the above and other objects that the present disclosure could achieve will be more clearly understood from the following detailed description.

TECHNICAL SOLUTION

In an aspect of the present disclosure, a method of controlling uplink transmission by a user equipment (UE) in a wireless communication system is provided. The method may include: receiving sounding reference signal (SRS) configuration information; performing a clear access procedure (CAP) for SRS transmission for each symbol based on the SRS configuration information, starting from a first symbol among a plurality of symbols; and performing an SRS transmission process based on success of the CAP in an M-th symbol among the plurality of symbols. Based on that M is less than or equal to a reference value, the SRS transmission may be performed in the M-th symbol among the plurality of symbols. Based on that M is greater than the reference value, the SRS transmission may be dropped in all symbols after the M-th symbol among the plurality of symbols.

In another aspect of the present disclosure, a UE for use in a wireless communication system is provided. The UE may include at least one processor and at least one computer memory operably connected to the at least one processor and configured to store instructions that, when executed, cause the at least one processor to perform operations. The operations may include: receiving SRS configuration information; performing a CAP for SRS transmission for each symbol based on the SRS configuration information, starting from a first symbol among a plurality of symbols; and performing an SRS transmission process based on success of the CAP in an M-th symbol among the plurality of symbols. Based on that M is less than or equal to a reference value, the SRS transmission may be performed in the M-th symbol among the plurality of symbols. Based on that M is greater than the reference value, the SRS transmission may be dropped in all symbols after the M-th symbol among the plurality of symbols.

In still another aspect of the present disclosure, a device for a UE is provided. The device may include at least one processor and at least one computer memory operably connected to the at least one processor and configured to store instructions that, when executed, cause the at least one processor to perform operations. The operations may include: receiving SRS configuration information; performing a CAP for SRS transmission for each symbol based on the SRS configuration information, starting from a first symbol among a plurality of symbols; and performing an SRS transmission process based on success of the CAP in an M-th symbol among the plurality of symbols. Based on that M is less than or equal to a reference value, the SRS transmission may be performed in the M-th symbol among the plurality of symbols. Based on that M is greater than the reference value, the SRS transmission may be dropped in all symbols after the M-th symbol among the plurality of symbols.

In a further aspect of the present disclosure, a computer-readable storage medium with at least one computer program configured to cause at least one processor to perform operations is provided. The operations may include: receiving SRS configuration information; performing a CAP for SRS transmission for each symbol based on the SRS configuration information, starting from a first symbol among a plurality of symbols; and performing an SRS transmission process based on success of the CAP in an M-th symbol among the plurality of symbols. Based on that M is less than or equal to a reference value, the SRS transmission may be performed in the M-th symbol among the plurality of symbols. Based on that M is greater than the reference value, the SRS transmission may be dropped in all symbols after the M-th symbol among the plurality of symbols.

Preferably, the SRS configuration information may include first information about the number of SRS symbols K, and the reference value may be determined based on the first information.

Preferably, based on that the number of symbols after the M-th symbol is greater than the number of SRS symbols, the SRS transmission may be performed only in a maximum of K symbols among the symbols after the M-th symbol among the plurality of symbols.

Preferably, an SRS index corresponding to the SRS transmission in the M-th symbol may have an index value obtained by indexing from the M-th symbol among the plurality of symbols.

Preferably, an SRS index corresponding to the SRS transmission in the M-th symbol may have an index value obtained by indexing from the first symbol among the plurality of symbols.

Advantageous Effects

According to the present disclosure, a wireless signal may be efficiently transmitted and received in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure, illustrate embodiments of the present disclosure and together with the description serve to explain the principle of the present disclosure.

BEST MODE

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). $3^{rd}$ generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

As more and more communication devices require larger communication capacities, the need for enhanced mobile broadband communication relative to the legacy radio access technologies (RATs) has emerged. Massive machine type communication (MTC) providing various services to inter-connected multiple devices and things at any time in any place is one of significant issues to be addressed for next-generation communication. A communication system design in which services sensitive to reliability and latency are considered is under discussion as well. As such, the introduction of the next-generation radio access technology (RAT) for enhanced mobile broadband communication (eMBB), massive MTC (mMTC), and ultra-reliable and low latency communication (URLLC) is being discussed. For convenience, this technology is called NR or New RAT in the present disclosure.

While the following description is given in the context of a 3GPP communication system (e.g., NR) for clarity, the technical spirit of the present disclosure is not limited to the 3GPP communication system.

In a wireless access system, a user equipment (UE) receives information from a base station (BS) on DL and transmits information to the BS on UL. The information transmitted and received between the UE and the BS includes general data and various types of control information. There are many physical channels according to the types/usages of information transmitted and received between the BS and the UE.

Figure 1:
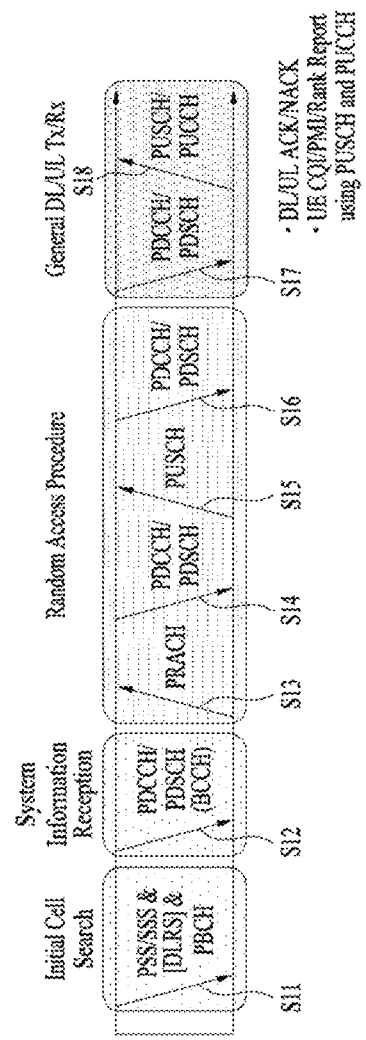
FIG. 1 illustrates physical channels and a general signal transmission method using the physical channels in a $3^{rd}$ generation partnership project (3GPP) system as an exemplary wireless communication system.

FIG. 1 illustrates physical channels and a general signal transmission method using the physical channels in a 3GPP system.

When a UE is powered on or enters a new cell, the UE performs initial cell search (S101). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

Subsequently, to complete connection to the BS, the UE may perform a random access procedure with the BS (S103 to S106). Specifically, the UE may transmit a preamble on a physical random access channel (PRACH) (S103) and may receive a PDCCH and a random access response (RAR) for the preamble on a PDSCH corresponding to the PDCCH (S104). The UE may then transmit a physical uplink shared channel (PUSCH) by using scheduling information in the RAR (S105), and perform a contention resolution procedure including reception of a PDCCH and a PDSCH signal corresponding to the PDCCH (S106).

After the above procedure, the UE may receive a PDCCH and/or a PDSCH from the BS (S107) and transmit a physical uplink shared channel (PUSCH) and/or a physical uplink control channel (PUCCH) to the BS (S108), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

Figure 2:
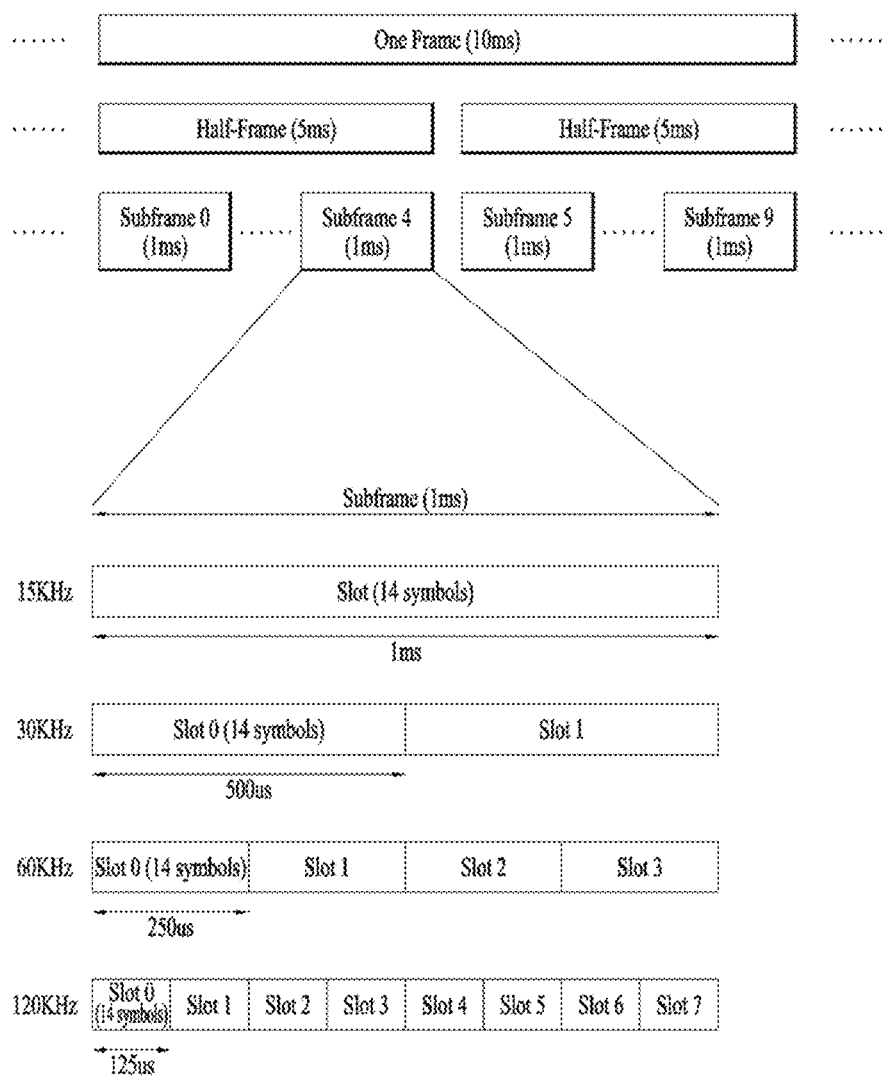
FIG. 2 illustrates a radio frame structure.

FIG. 2 illustrates a radio frame structure.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS ($15 * 2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: number of symbols in a slot
* $N^{frame,u}_{slot}$: number of slots in a frame
* $N^{subframe,u}_{slot}$: number of slots in a subframe Table 2 illustrates that the number of symbols per slot, the number of slots per frame, and the number of slots per subframe vary according to SCSs in an extended CP case.

TABLE 2

| SCS ($15 * 2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The frame structure is merely an example, and the number of subframes, the number of slots, and the number of symbols in a frame may be changed in various manners.

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells. A symbol may include an OFDM symbol (or a CP-OFDM symbol) and an SC-FDMA symbol (or a discrete Fourier transform-spread-OFDM (DFT-s-OFDM) symbol).

NR may support various numerologies (or subcarrier spacings (SCSs)) to provide various 5G services. For example, NR may support a wide area in conventional cellular bands in an SCS of 15 kHz and support a dense urban area and a wide carrier bandwidth with lower latency in an SCS of 30/60 kHz. In an SCS of 60 kHz or above, NR may support a bandwidth higher than 24.25 GHz to overcome phase noise.

NR frequency bands may be divided into two frequency ranges: frequency range 1 (FR1) and frequency range 2 (FR2). FR1 and FR2 may be configured as shown in Table 3 below. FR 2 may mean a millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600MHz | 60, 120, 240 kHz |

Figure 3:
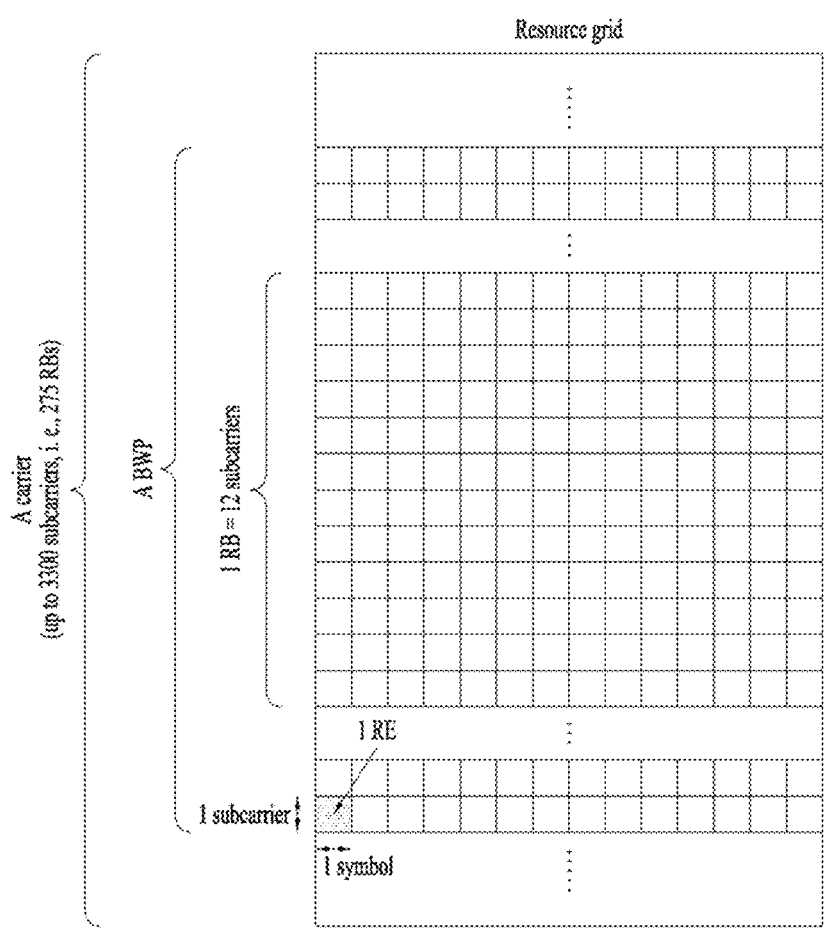
FIG. 3 illustrates a resource grid during the duration of a slot.

FIG. 3 illustrates a resource grid during the duration of one slot. A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 4:
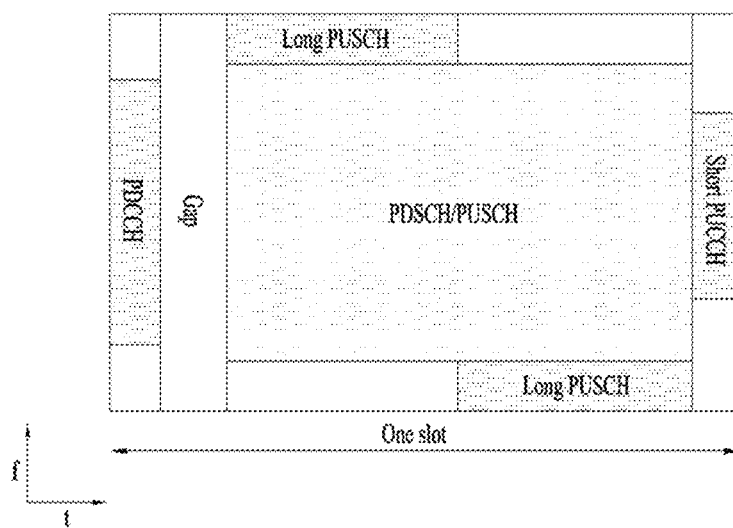
FIG. 4 illustrates mapping of physical channels in a slot.

FIG. 4 illustrates a structure of a slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel (e.g., PDCCH), and the last M symbols (hereinafter, UL control region) in the slot may be used to transmit a UL control channel (e.g., PUCCH). N and M are integers greater than or equal to 0. A resource region (hereinafter, a data region) that is between the DL control region and the UL control region may be used for DL data (e.g., PDSCH) transmission or UL data (e.g., PUSCH) transmission. The GP provides a time gap for the BS and UE to transition from the transmission mode to the reception mode or from the reception mode to the transmission mode. Some symbols at the time of DL-to-UL switching in a subframe may be configured as the GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PUCCH delivers uplink control information (UCI). The UCI includes the following information.

SR: information used to request UL-SCH resources.

HARQ-ACK: a response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term "HARQ-ACK is interchangeably used with HARQ ACK/NACK and ACK/NACK.

CSI: feedback information for a DL channel. Multiple input multiple output (MIMO)-related feedback information includes an RI and a PMI.

Table 4 illustrates exemplary PUCCH formats. PUCCH formats may be divided into short PUCCHs (Formats 0 and 2) and long PUCCHs (Formats 1, 3, and 4) based on PUCCH transmission durations.

TABLE 4

| PUCCR format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

Figure 5:
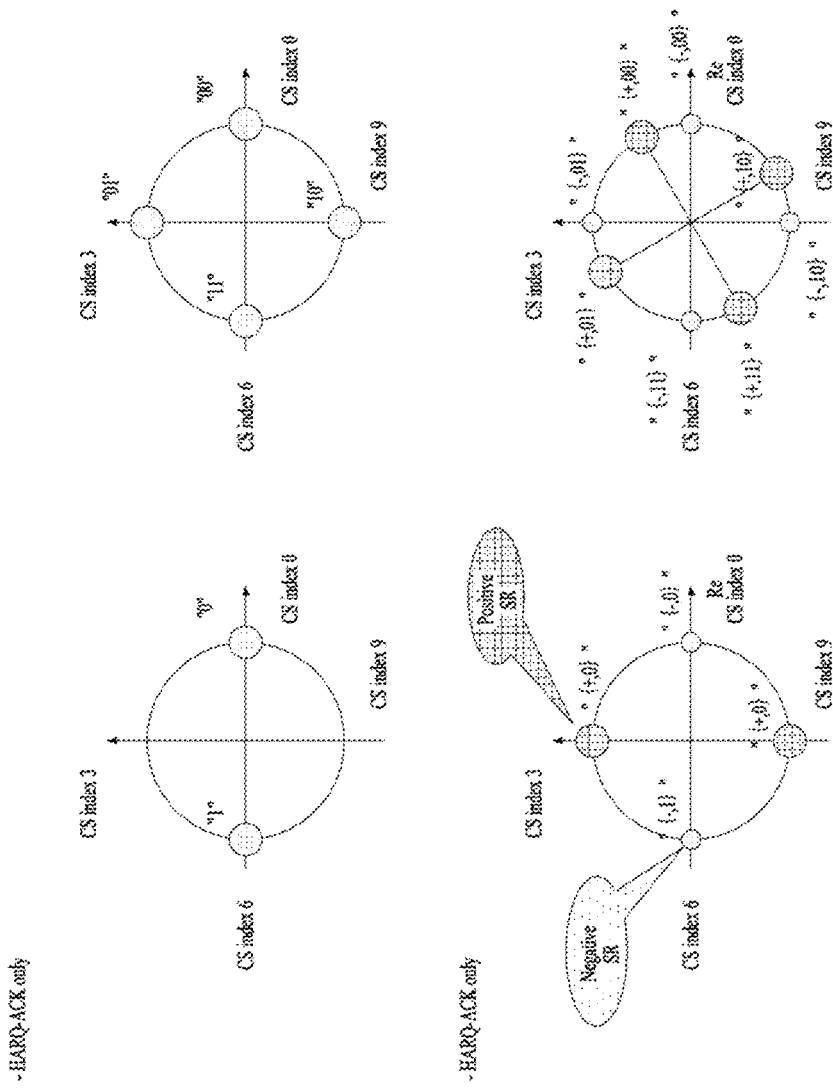
FIGS. 5 and 6 illustrate structures of a physical uplink control channel (PUCCH).

Referring to FIG. 5, PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. When the UE transmits a positive SR, the UE may transmit a selected sequence on a PUCCH resource for the corresponding SR configuration. PUCCH format 0 may occupy one PRB in the frequency domain and occupy one or two OFDM-based symbols in the time domain.

Figure 6:
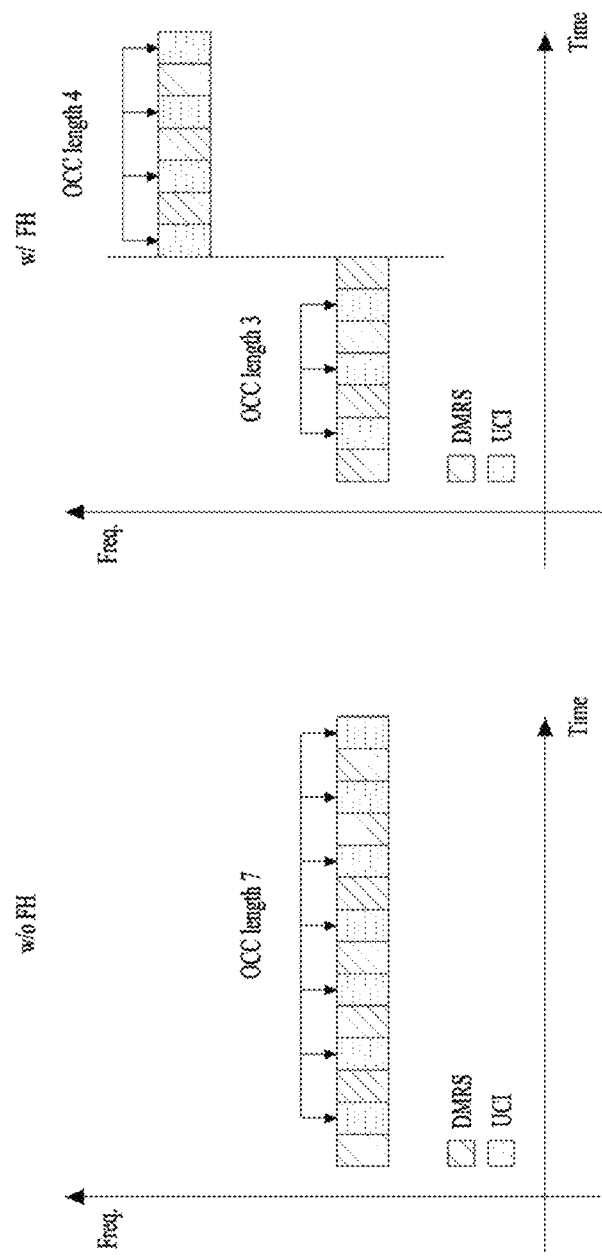

Referring to FIG. 6, PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)). PUCCH format 0 may occupy one PRB in the frequency domain and occupy 4 to 14 OFDM-based symbols in the time domain.

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

Recently, the 3GPP standardization group has proceeded to standardize a 5G wireless communication system named new RAT (NR). The 3GPP NR system has been designed to provide a plurality of logical networks in a single physical system and support services with various requirements (e.g., eMBB, mMTC, URLLC, etc.) by changing a transmission time interval (TTI) and/or an OFDM numerology (e.g., OFDM symbol duration, SCS, etc.). In recent years, data traffic has significantly increased with the advent of smart devices. Thus, the 3GPP NR system has also considered the use of an unlicensed band for cellular communication as in License-Assisted Access (LAA) of the legacy 3GPP LTE system. However, unlike the LAA, a NR cell in the unlicensed-band (NR U-cell) aims to support standalone operation. For example, PUCCH, PUSCH, and/or PRACH transmission may be supported in the NR UCell.

Figure 7:
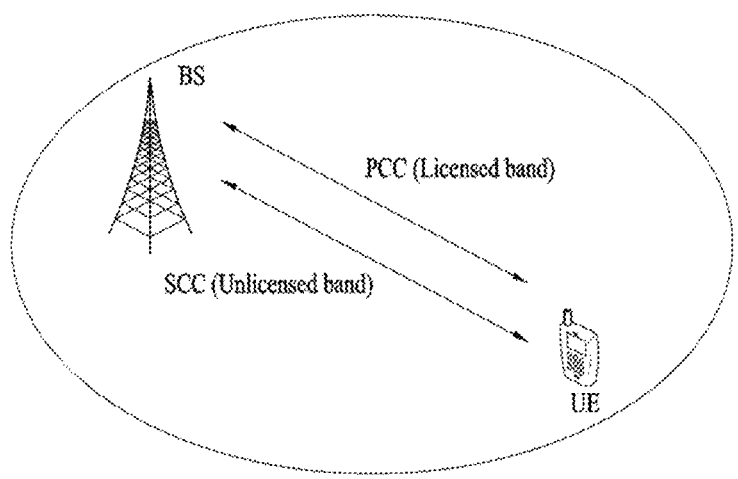
FIG. 7 illustrates a wireless communication system supporting an unlicensed band.
Figure 7:
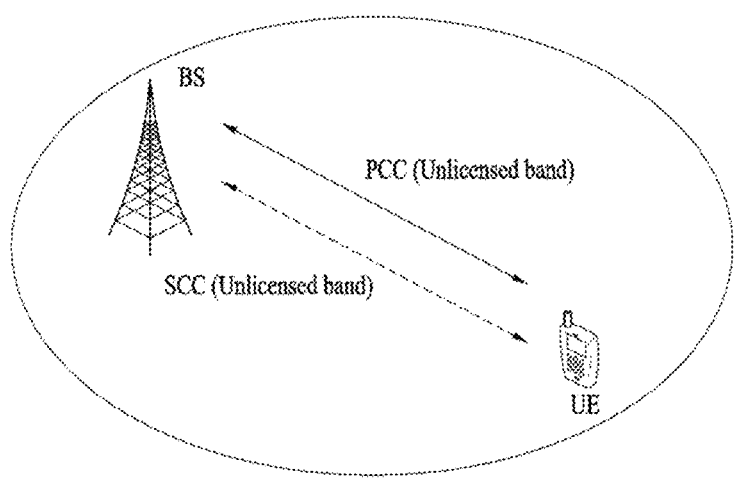

FIG. 7 illustrates an exemplary wireless communication system supporting an unlicensed band applicable to the present disclosure. In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When carrier aggregation is supported, one UE may use a plurality of aggregated cells/carriers to exchange a signal with the BS. When one UE is configured with a plurality of CCs, one CC may be set to a primary CC (PCC), and the remaining CCs may be set to secondary CCs (SCCs). Specific control information/channels (e.g., CSS PDCCH, PUCCH) may be transmitted and received only on the PCC. Data may be transmitted and received on the PCC/SCC. FIG. 7(a) shows a case in which the UE and BS exchange signals on both the LCC and UCC (non-standalone (NSA) mode). In this case, the LCC and UCC may be set to the PCC and SCC, respectively. When the UE is configured with a plurality of LCCs, one specific LCC may be set to the PCC, and the remaining LCCs may be set to the SCC. FIG. 7(a) corresponds to the LAA of the 3GPP LTE system. FIG. 7(b) shows a case in which the UE and BS exchange signals on one or more UCCs with no LCC (standalone (SA) mode). In this case, one of the UCCs may be set to the PCC, and the remaining UCCs may be set to the SCC. Both the NSA mode and SA mode may be supported in the U-band of the 3GPP NR system.

Figure 8:
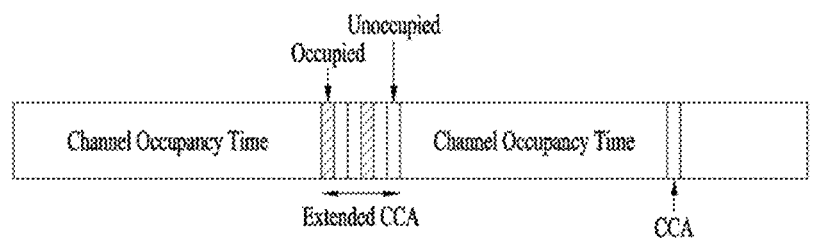
FIG. 8 illustrates a method of occupying a resource in an unlicensed band.

FIG. 8 illustrates an exemplary method of occupying resources in an unlicensed band. According to regional regulations for the U-band, a communication node in the U-band needs to determine whether a corresponding channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), if the detected channel energy is higher than the CCA threshold, the communication node may determine that the channel is busy. Otherwise, the communication node may determine that the channel is idle. When it is determined that the channel is idle, the communication node may start the signal transmission in the UCell. The Wi-Fi standard (802.11ac) specifies a CCA threshold of 62 dBm for non-Wi-Fi signals and a CCA threshold of −82 dBm for Wi-Fi signals. The sires of processes described above may be referred to as Listen-Before-Talk (LBT) or a channel access procedure (CAP). The LBT may be interchangeably used with the CAP.

In Europe, two LBT operations are defined: frame based equipment (FBE) and load based equipment (LBE). In FBE, one fixed frame is made up of a channel occupancy time (e.g., 1 to 10 ms), which is a time period during which once a communication node succeeds in channel access, the communication node may continue transmission, and an idle period corresponding to at least 5% of the channel occupancy time, and CCA is defined as an operation of observing a channel during a CCA slot (at least 20 us) at the end of the idle period. The communication node performs CCA periodically on a fixed frame basis. When the channel is unoccupied, the communication node transmits during the channel occupancy time, whereas when the channel is occupied, the communication node defers the transmission and waits until a CCA slot in the next period.

In LBE, the communication node may set $q \in \{4, 5, \ldots, 32\}$ and then perform CCA for one CCA slot. When the channel is unoccupied in the first CCA slot, the communication node may secure a time period of up to (13/32)q ms and transmit data in the time period. When the channel is occupied in the first CCA slot, the communication node randomly selects $N \in \{1, 2, \ldots, q\}$, stores the selected value as an initial value, and then senses a channel state on a CCA slot basis. Each time the channel is unoccupied in a CCA slot, the communication node decrements the stored counter value by 1. When the counter value reaches 0, the communication node may secure a time period of up to (13/32)q ms and transmit data.

Example: Uplink Transmission in NR-U

Figure 9:
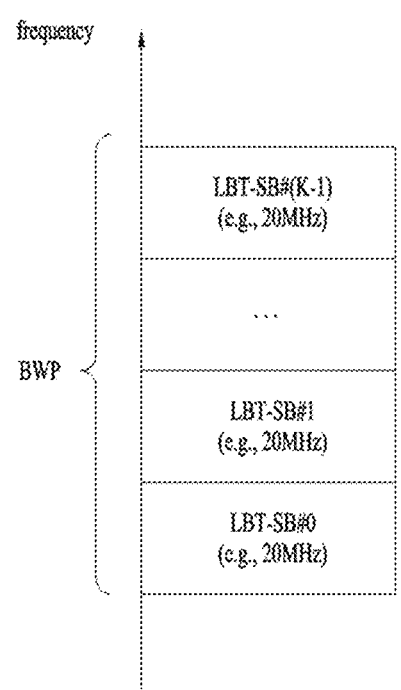
FIG. 9 illustrates a structure of a BWP (bandwidth part).

For U-bands, it is first determined by the LBT or CCA procedure whether a medium is idle before signal transmission. If the medium (or radio channel) is determined to be busy in a specific resource unit (e.g., an OFDM/SC-FDMA symbol, a slot, a subframe, or a specific TTI-based time unit), the UE or BS may drop signal transmission in the corresponding resource unit. Alternatively, the UE or BS may drop signal transmission in a specific duration of the corresponding resource unit (e.g., a duration from the time when the medium is determined to be busy to the time when the medium is determined to be idle) but perform signal transmission in the remaining parts. This may be applied to the frequency domain. For example, when CCA is performed independently for two or more CCs/BWPs, if LBT is successful only in a specific CC/BWP, signal transmission may be partially allowed only in the corresponding CC/BWP. Here, a basic frequency resource unit for performing LBT may be named an LBT-SB (subband). FIG. 9 illustrates a case in which a plurality of LBT-SBs are included in a BWP. The LBT-SB may have a band of, for example, 20 MHz. The LBT-SB may include a plurality of consecutive (P)RBs.

In a U-band, when a transmitting device transmits a signal by occupying a medium for a specific period of time in the corresponding band, the minimum bandwidth that needs to be occupied by the transmitted signal may be regulated as the requirement. The maximum allowable transmit power at 1 MHz for a specific time may also be regulated. These regulations are for coexistence between heterogeneous systems operating in U-bands and are generally required for systems operating in U-bands. According to the above-described U-band requirements, the resource structures of PUCCH formats 0 and 1 of the NR system need to be modified for use in U-bands. That is, NR PUCCH formats 0 and 1 need to be distributed over a wide band because the maximum occupied bandwidth may be lower than 1 MHz. Accordingly, the present disclosure proposes resource (allocation) structures of NR PUCCH formats 0 and 1 suitable for U-bands.

Since the NR system supports use of multiple beams, more resources are required to transmit an SRS than the legacy LTE system. For SRS transmission in a U-band, a plurality of candidate resources need to be configured in preparation for LBT failure. When the UE uses or is configured with a bandwidth corresponding to two or more LBT-SBs, the UE may perform LBT on an LBT-SB basis and transmit the SRS in each LBT-SB. In this case, there may be transmission/reception interference between the SRS transmission and the LBT, which are performed by the UE. In addition, information about a beam used for the SRS transmission may be distorted between the BS and UE in accordance with the relationship between the LBT and SRS transmission. The present disclosure proposes the structures of a multi-symbol SRS and multi-LBT-SB to solve the above-described problem.

First, proposals for the resource (allocation) structure of NR PUCCH formats 0 and 1 will be described, and then proposals for the NR SRS will be described.

Section 1: Interlaced PUCCH Formats 0 and 1

Figure 10:
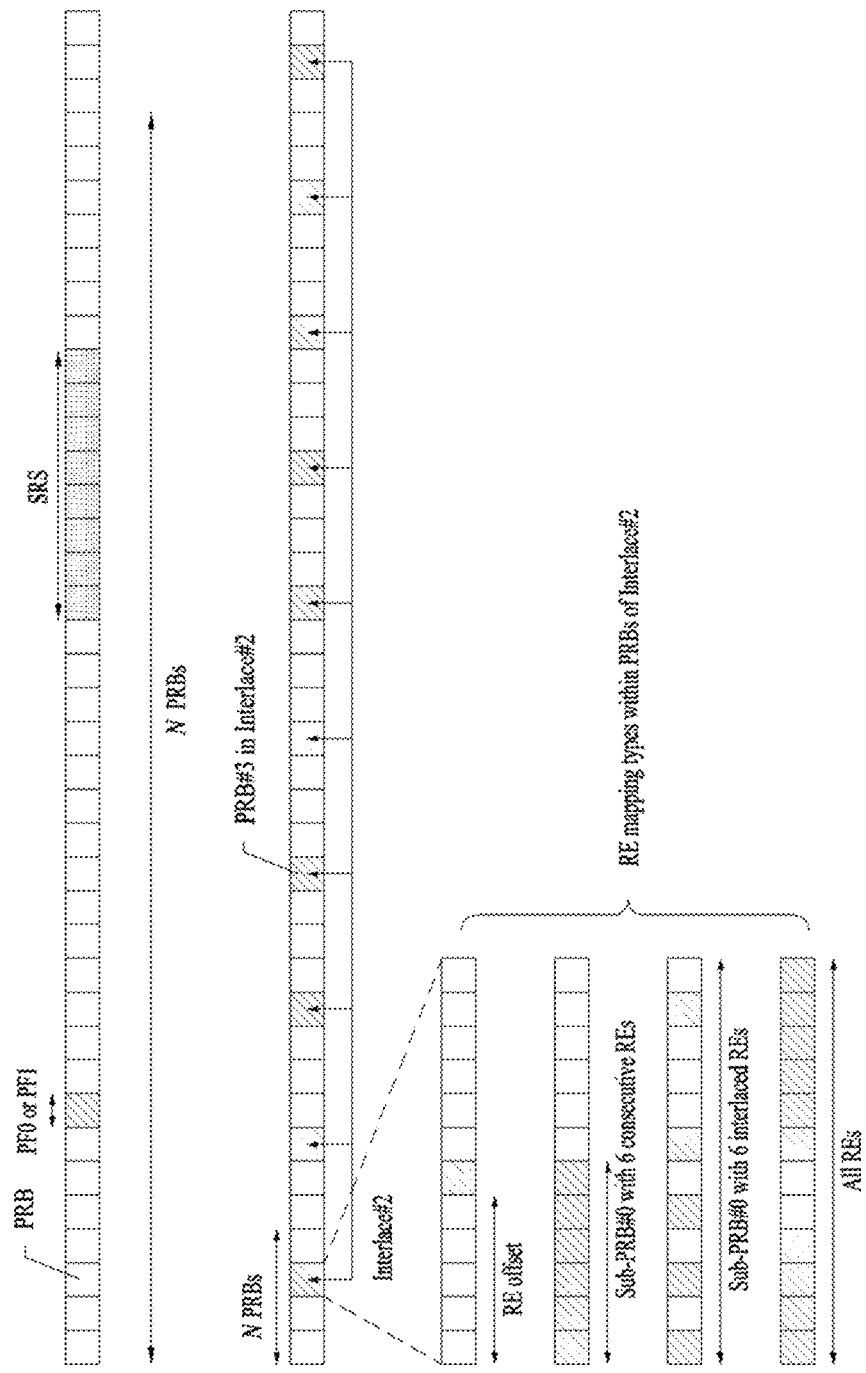
FIG. 10 illustrates a structure of an interlaced PUCCH.

FIG. 10 shows a resource structure in which M interlaces are configured in N PRBs. In FIG. 10, the number of PRBs included in the M interlaces may be L or L+1, where L is floor (N/M), and floor ( ) denotes the rounding down function. When N%M is not 0, each of some interlaces may include L+1 PRBs (herein, % represents the modulo operation). In the present disclosure, it is assumed that the number of PRBs of an interlace is L for convenience of description. PRBs in each interlace are located at the same interval, and a transmitter (e.g., UE) may use one or more interlaces when transmitting a signal/channel. In general, it is not supported that all REs of some PRBs included in an interlace are not used (that is, it is not supported that only a specific PRB is selectively used among PRBs included in the interlace). However, the present disclosure does not exclude that "only a specific PRB of an interlace is selectively used for transmission according to the importance or characteristic of a channel". In this case, the proposed method may be equally applied to two or more transmission PRBs, but for convenience of description, it is assumed that all PRBs included in an interlace are used for transmission.

The interlaced resource configuration proposed in this section may be applied when the frequency resource occupied by an existing signal/channel is less than or equal to one PRB. For convenience of description, PUCCH formats 0 and 1 of the NR system are assumed. PUCCH formats 0 and 1 have the following characteristics, and thus methods proposed based on PUCCH formats 0 and 1 may be equally applied to signals/channels having similar characteristics.

1. NR PUCCH Format 0 (PF0): No DMRS is included, and information is obtained by non-coherent detection of a sequence used for transmission. To identify multiple users, each user may select a different sequence set.

2. NR PUCCH Format 1 (PF1): A DMRS is included, and information is obtained by coherent detection of a sequence transmitted based thereon. To identify multiple users, a transmission symbol may spread to a sequence with a specific length (e.g., 12) for each user.

As described above, when the number of REs included in a previously designed signal/channel (e.g., a typical narrowband signal/channel in consideration of use in an L-band) is smaller than the number of REs included in a channel frequency resource for a U-band, the corresponding signal/channel needs to be modified.

Hereinafter, a method of extending the length/size of an existing signal/channel or modifying resource allocation/mapping thereof for signal/channel transmission in U-bands will be described. First, the present disclosure proposes the following resource configuration method to modify the resource allocation of the signal/channel. In the proposed resource configuration method, all REs in a PRB may not need to be used for signal/channel transmission, and the following method has the same sequence as that of "RE mapping types within PRBs of Interlace #2" of FIG. 10.

1. PI-FDMA (Perfect Interleaved-FDMA): Resource mapping is performed at the RE level in all PRBs in an interlace.

2. SI-FDMA (Sub-PRB Interleaved-FDMA): Resource mapping is performed at the sub-PRB level in all PRBs in an interlace (the number of REs included in a sub-PRB is greater than 1 and smaller than the number of REs in a PRB (e.g., 12)).

(2-1) bSI-FDMA (block-type SI-FDMA): REs included in a sub-PRB are continuous within a PRB.

(2-2) cSI-FDMA (comb-type SI-FDMA): REs included in a sub-PRB are discontinuous within a PRB, and each RE is located at the same interval.

3. BI-FDMA (Block Interleaved-FDMA): Resource mapping is applied to all REs of all PRBs in an interlace.

Figure 11:
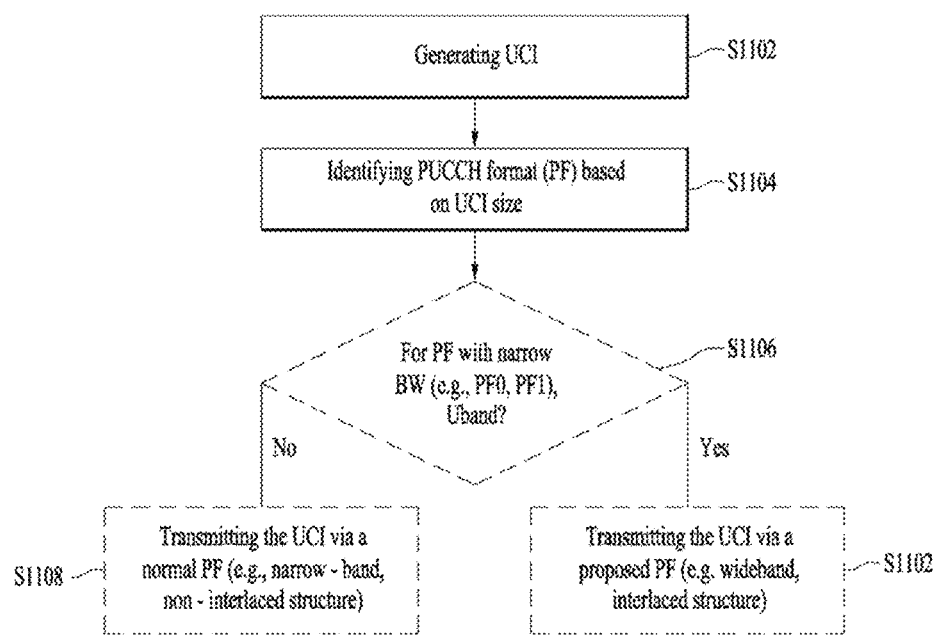
FIG. 11 illustrates PUCCH transmission according to an embodiment of the present disclosure.

FIG. 11 illustrates PUCCH transmission according to an embodiment of the present disclosure. Referring to FIG. 11, a UE may generate UCI (S1102). The UCI may include at least one of CSI, HARQ-ACK, or SR. Thereafter, the UE may check a PUCCH format (PF) based on the UCI size (S1104). Details of the PF are found in Table 4. For a PF with a narrow bandwidth (or band) (e.g., one RB) (i.e., PFs 0 and 1), the UE may have a different PF structure depending on whether a PUCCH is transmitted in a U-band (S1106). For example, if the PUCCH is not transmitted in the U-band (i.e., if the PUCCH is transmitted in an L-band), the UE may transmit the UCI based on the existing PF structure (i.e., narrowband and non-interlaced structure). On the other hand, when the PUCCH is transmitted in the U-band, the UE may transmit the UCI based on the proposed PF structure (i.e., wideband and interlaced structure). The proposed PF structure will be described in detail below (in Proposals #1-1 to #1-3). When only U-band(s) are configured for the UE, S1106 and S1108 may be omitted. Meanwhile, when the PF determined in S1104 has a wideband (e.g., PFs 2 to 4), the UE may transmit the UCI based on the existing PF structure (i.e., narrowband and non-interlaced structure). For the BS, S1102 may be replaced by a step of determining the UCI size, and steps S1108 to S1110 may be replaced by a step of receiving the UCI based on the corresponding PF.

[Proposal #1-1] Method of Extending Narrowband Signal/Channel to Wideband Based on PI-FDMA Structure for Signals/Channels Based on Non-Coherent Detection In existing NR PF0, a CS value is applied to a 12-length sequence to distinguish 12 pieces of information on the same time/frequency resource. Here, the 12 pieces of information are used to identify a plurality of users while representing UCI of the UE (one of up to four pieces of information). Since the 12-length sequence is transmitted on 12 consecutive REs of one PRB in an L-band, the 12-length sequence may be mapped based on the PI-FDMA structure for suitable use in a U-band. However, the length/value of the sequence may not be the same as that of existing PF0 and may vary depending on the number of PRBs existing in an interlace. That is, the sequence configuration/definition of the proposed method may be the same as that of existing NR PF0, or it may be obtained by repeating the sequence of NR PF0 or dropping a part thereof. Further, a new sequence may be defined. The newly defined sequence may be obtained by repeating a specific sequence. Herein, the sequence repetition may mean not only that repeated sequences need to be exactly the same but also that some parameters (e.g. phase, mapping order, etc.) are different between the repeated sequences. The reason for this is to decrease the peak-to-average power ratio (PAPR) of a sequence transmitted by PI-FDMA or to obtain high self-correlation and low inter-correlation characteristics.

The proposed PI-FDMA structure may be applied because NR PF0 is a signal/channel designed based on non-coherence detection and information is distinguished by a CS value (i.e., the position of the maximum correlation value in the time domain). In other words, even when the channel delay profile is not an impulse response, information (i.e., CS) detection may be enabled if the position of the maximum correlation value in the time domain is identified. In addition, when a specific interlace is used for PI-FDMA-based PF0, there may be 12 selectable REs in a PRB of an interlace, which may also be used for information transfer. Accordingly, the number of pieces of information generated by the proposed method is "(a) the locations/number of REs used for PF0 transmission in a PRB of an interlace"דthe number of CSs of a sequence transmitted on the corresponding REs". The corresponding information may be used for the following purposes: UCI and/or SR and multi-user identification. For example, the RE locations of (a) may be used to identify multiple users, and the CS of (b) may be used to identify UCI of a specific user, and vice versa. Further, (a) may be used to represent SR information or identify multiple users, and (b) may be used to represent ACK/NACK information.

According to the above proposal, the BS may transmit to each UE interlace indices of PI-FDMA and information about RE(s) used for PF0 transmission in a PRB of a corresponding interlace. In addition, a resource (e.g., an RE location and/or a CS) for representing each piece of information (e.g., UCI, SR, etc.) may also be provided to the UE by the BS or defined in specifications.

Since the PI-FDMA structure has a large interval between REs used for signal/channel transmission, the PI-FDMA structure is not suitable for a channel structure in which a symbol representing information (hereinafter such a symbol is referred to as data symbol) (e.g., modulation symbol) and an RS are frequency division multiplexed (FDMed) in the frequency domain, among methods that require coherent detection. On the other hand, when the symbol and RS are time division multiplexed (TDMed) in the time domain, if the frequency/time interval between the symbol and RS is less than the coherence frequency/time, the PI-FDMA structure may be applied. Such a case may correspond to NR PF1. Accordingly, Proposal #1-1 described with reference to PF0 may be equally applied to PF1. However, since symbols including an RS (e.g., DMRS) for coherent detection and UCI/SR information are spread by each sequence for multi-user multiplexing (or multiple access), Proposal #1-1 may be applied to PF1 if two OFDM or SC-FDMA symbols are secured.

[Proposal #1-2] Method of Extending Narrowband Signal/Channel to Wideband Based on SI-FDMA Structure NR PF0 may be transmitted on resources in the SI-FDMA structure in the same way as described in Proposal #1-1. However, the following differences are present in terms of sequence configuration and information representation.

1. Configuration of Sequence

Proposal #1-2 has a structure in which the number of REs used for PF0 transmission increases by an integer multiple (M) compared to Proposal #1-1. Accordingly, the sequence configuration and mapping method may be different from that of Proposal #1-1.

1-1) The total length of a sequence is the same as the number of REs (K) used for PF0 transmission.

1-2) A value obtained by dividing the number of REs (K) used for PF0 transmission by M is defined as the length of a sub-sequence, and the sub-sequence is extended to a K-length sequence.

For example, if the number of REs included in a sub-PRB is 6, the REs in a PRB used for PF0 transmission may be sequentially defined as RE-0, RE-1, . . . , RE-5, and an interlaced RE set based on PI-FDMA with respect to RE-x may be defined as sub-PRB-x. In this case, the sub-sequence may be mapped to RE-0 (i.e., sub-PRB-0) of each PRB of the interlace (see Proposed Method #1), and the mapping may be repeated for sub-PRB-1, sub-PRB-5. Here, the repetition includes not only a case in which the sub-sequence of sub-PRB-0 is identically repeated for remaining sub-PRB-x, but also a case in which the sub-sequence of each sub-PRB-x is multiplied by a phase or a case in which each sub-PRB-x has a different sub-sequence mapping order.

1-3) The number (Q) of REs constituting a sub-PRB included in one PRB among PRB(s) used for PF0 transmission is defined as the sub-sequence length, and the Q-length sub-sequence is extended to the number of REs (K) used for PF0 transmission.

For example, if the number of REs included in a sub-PRB is 6, REs in PRB-x used for PF0 transmission may be sequentially defined as RE-0, RE-1, . . . , RE-5, and the set of the corresponding REs may be defined as sub-PRB-x. In this case, the sub-sequence may be repeatedly mapped to sub-PRB-x. For example, the sub-sequence may be mapped to sub-PRB-x (see Proposed Method #1), and the mapping may be repeated for sub-PRB-1, sub-PRB-5. Here, the repetition may include not only a case in which the sequence of sub-PRB-0 is identically repeated for remaining sub-PRB-x, but also a case in which the sub-sequence of each sub-PRB-x is multiplied by a phase or a case in which each sub-PRB-x has a different sub-sequence mapping order.

2. Information Representation Method

Accordingly, the number of pieces of information generated by the proposed method is "(a) the locations/number of sub-PRBs used for PF0 transmission in a PRB of an inter-lace"דּ"(b) the number of CSs applied to a sub-sequence"× "the number of combinations of phases and/or mapping orders applied to repetition of each sub-sequence to configure an entire sequence". The information may be used for UCI and/or SR and multi-user identification.

3. PF0 Transmission-Related Parameters Provided by BS to UE

The BS may provide to each UE (a) the index of an interlace, (b) information about sub-PRBs used for PF0 transmission in a PRB of the corresponding interlace, and/or (c) parameters used to extend a sub-sequence. In addition, a resource (e.g., a sub-PRB location, a CS, and/or a configuration relationship between a sub-sequence and a sequence) for representing each piece of information may also be provided to the UE by the BS or defined in specifications.

In Proposal #1-2, the PAPR may relatively increase, and thus correlation characteristics may be relatively degraded, compared to Proposal #1-1. Therefore, the PAPR and correlation characteristics need to be considered in allocating sequence sets, which are generated according to the sequence configuration method, to multiple users and UCI/SR information. Based on the PAPR and/or correlation characteristics, the best sequence (i.e., low PAPR, high self-correlation, low inter-correlation) in terms of the transmitter/receiver may be first assigned to an ACK, which is expected to be frequently transmitted. That is, the best sequence may be assigned to a NACK, which is expected to less frequently transmitted, with a lower priority. In addition, a sequence with a good PAPR and good correlation characteristics may be assigned to an SR, which has a low frequency but is important in latency, with a relatively high priority, compared to the NACK.

Proposal #1-2, which has been described based on PF0, may be equally applied to PF1, Similarly to Proposal #1-1. However, since symbols including an RS (e.g., DMRS) for coherent detection and UCI/SR information are spread by each sequence in the frequency domain for multi-user multiplexing (or multiple access), Proposal #1-2 may be applied to PF1 if two OFDM or SC-FDMA symbols are secured.

[Proposal #1-3] Method of Extending Narrowband Signal/Channel to Wideband Based on BI-FDMA Structure A method of extending a narrowband signal/channel to a wideband based on the BI-FDMA structure corresponds to a case where the number of REs included in a sub-PRB is the same as the number of REs included in a PRB in Proposition #1-2. Accordingly, Proposal #1-3 may be the same as Proposal #1-2, except that the number of REs included in the sub-PRB is the same as the number of REs in the PRB.

Section 2: Multi-Symbol SRS

The usage of a NR SRS may include 'codebook', 'non-Codebook', 'antennaSwitching', and 'BeamManagement'. The method proposed in the present disclosure may be applied regardless of the usage. However, when the NR SRS usage is 'antennaSwitching' or when the UE (or BS) requires a (switching) gap between SRS transmissions, an additional scheme may be considered. An SRS transmission resource may be configured based on an SRS resource set, the SRS resource set may include one or more SRS resources, and each SRS resource may include one or more SRS symbols. Here, the SRS symbol includes an OFDM-based symbol (e.g., OFDM/SC-FDMA symbol). Each SRS symbol in the same SRS resource may use the same SRS transmission beam (it may be represented by a spatial transmission filter used for SRS transmission or defined by a spatial reception filter for deriving the spatial transmission spatial filter to be used for the SRS transmission). An SRS transmission beam may be represented by an SRS symbol index. The SRS symbol index may be identified by the index of a symbol in which the SRS is transmitted or an SRS transmission parameter (e.g., CS and/or comb). For each SRS resource, a beam used for SRS transmission may be indicated. For example, the UE may be indirectly instructed to use, as the SRS transmission beam, a spatial filter used when receiving a specific SSB and/or CSI-RS. That is, the same or different transmission beams may be applied to SRS resources, which follows the configuration of the BS. If no SRS beam configuration is received from the BS, the UE may configure the SRS transmission beam in a random manner.

In a U-band, some SRS symbols may not be transmitted according to the LBT result before SRS transmission. Therefore, if SRS reception performance is poor, the BS may not determine whether the SRS transmission beam of the UE and the SRS reception beam of the BS are not aligned in the spatial domain (when the reception quality is poor) or no SRS is transmitted due to LBT failure of the UE. Accordingly, the present disclosure proposes a method of overcoming such ambiguity or minimizing the effect thereof.

Figure 12:
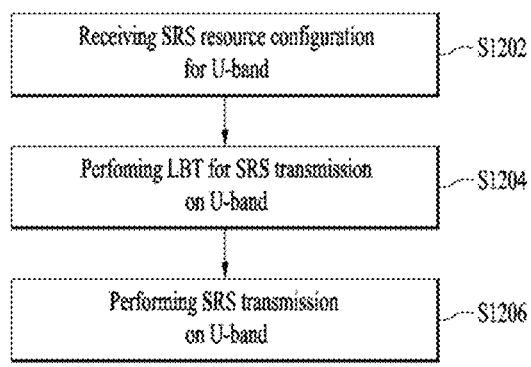
FIGS. 12 to 15 illustrate sounding reference signal (SRS) transmission according to an embodiment of the present disclosure.

FIG. 12 illustrates an SRS process according to an embodiment of the present disclosure. Referring to FIG. 12, a UE may receive configuration information about an SRS transmission resource for a U-band from a BS (S1202). In this case, the SRS transmission resource may be configured based on an SRS resource set, the SRS resource set may include one or more SRS resources, and each SRS resource may include one or more SRS symbols. The UE may perform LBT for SRS transmission in the U-band based on a transmission period or according to a non-periodic SRS transmission command (S1204). Then, the UE may transmit an SRS on the SRS transmission resource based on LBT results (S1206). The configuration of an SRS transmission resource, an SRS transmission method according to LBT, and SRS-related signaling will be described in detail in the following proposals of the present disclosure.

Figure 13:
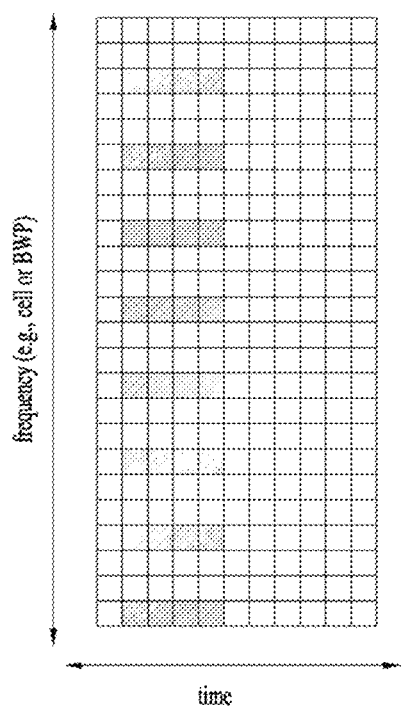

FIG. 13 illustrates SRS transmission resources in a slot. In a U-band, SRSs may be configured in an interlaced structure. An interlace may include a plurality of non-consecutive (P)RBs in the frequency domain. In FIG. 13, hatched areas represent time/frequency resources (e.g., SRS symbols/resources) (e.g., SRS resources) in which SRSs are capable of being transmitted. For example, an SRS resource may include four symbols in the time domain and every third PRB in the frequency domain. Here, the symbol includes an OFDM-based symbol (e.g., OFDM/SC-FDMA symbol). An SRS is transmitted in each symbol, and the SRS transmitted in each symbol (hereinafter referred to as an SRS symbol) may use the same SRS transmission beam (e.g., spatial filter). The SRS transmission beam may be identified by an SRS symbol index.

[Proposal #2-1] Method of Reporting Location of Symbol in Which SRS Is Transmitted to BS The UE may perform SRS transmission only on some resources among SRS resources configured by the BS or in some symbols of the corresponding resources. In this case, the BS needs to know the location of an SRS resource in which the UE transmits an SRS. To this end, the BS may perform the following operations.

1. When receiving a next SRS, the BS may adjust a spatial filter used for SRS reception (for example, the BS may use a spatial filter which the BS has used for SRS reception at the time when no SRS was transmitted in order to receive the next SRS).

2. The BS may instruct the UE to adjust/rearrange a transmission beam to be applied to an SRS resource for next SRS transmission or symbols in the SRS resource (the adjustment/realignment may be performed based on information such as a reference SSB or CSI-RS for deriving a spatial filter to be used for an SRS transmission beam).

Here, information about the resource on which the SRS is actually transmitted may be indirectly confirmed based on information about the resource to which no SRS is transmitted.

The information about the resource on which the SRS is actually transmitted may be transmitted by a parameter related to sequence generation for defining the SRS or on the time/frequency resource in which the SRS is transmitted. In addition, the corresponding information may be transmitted over a PUCCH, a PUSCH, or a third signal. In this case, the information may be transmitted only when the BS requests the corresponding information. Here, the information about the resource on which the SRS is actually transmitted may be indicated by an SRS resource index or an SRS symbol index in a specific SRS resource index. The corresponding information may be provided as an index value, or an SRS that is actually transmitted or not transmitted may be represented by a value of 0 or 1 in the form of a bitmap.

Whether information related to SRS transmission is reported or the report type thereof may vary depending on whether the same transmission beam is configured to be used for the SRS resource or depending on an SRS transmission period (e.g., periodic, semi-persistent, or aperiodic).

[Proposal #2-2] Determination of SRS Transmission According to LBT Success or Failure If the number of SRS symbols in an SRS resource is Ns (>=1) and if the number of SRS symbols not transmitted due to LBT failure is Ms (<=Ns)), all SRS transmissions on the corresponding SRS resource may be dropped. In addition, when the number of SRS resources in an SRS resource set is Nr (>=1) and if the number of SRS resources not transmitted due to LBT failure is Mr (<=Nr)), all SRS transmissions in the corresponding SRS resource set may be dropped. Here, the values of Ms and Mr may be configured by the BS or derived/defined from the values of Ns and Nr.

[Proposal #2-3] Determination of SRS Transmission Beam Order According to LBT Success or Failure If some of the SRS symbols or resources are incapable of being transmitted due to LBT failure, the order of SRS transmission beams may be changed in a next SRS symbol or resource transmission opportunity. This may be equally applied even when there is no LBT failure. The reason for this is to reduce cases in which the same beam is not continuously applied to SRS transmission if the order of beams to be used in SRS symbol or resource transmission in a next period is mixed (e.g., a cyclic method, a specific random method, etc.), considering that the SRS transmission may be dropped in some SRS symbols/resources due to LBT failure of the UE. Information required to realign SRS transmission beams may be indicated by the BS or defined in specifications. When the UE rearranges the SRS transmission beams with no prior appointments, the UE needs to report information on the SRS transmission beams to the BS.

For example, a beam with the best channel quality between the UE and BS may be configured to be used in the latter half of consecutive SRS symbols or resources. This is to increase the SRS transmission probability of the corresponding beam even when SRS transmission is dropped due to LBT failure. The beam with the best channel quality between the UE and BS may include the following:

most recently from a specific time before SRS transmission,
a spatial transmission filter corresponding to a spatial filter used for receiving a PDCCH/PDSCH or a channel in which the corresponding PDCCH/PDSCH is successfully detected (ACK)

a spatial filter of a channel used for transmitting a PUCCH, a PUSCH, or a PUSCH for which NACK or retransmission is not indicated a spatial filter used for receiving a PDCCH/PDSCH indicating SRS transmission, or a spatial transmission filter corresponding to a spatial reception filter associated with a specific SSB.

In addition, information about the criteria for aligning the order of SRS beams based on channel quality may be provided to the UE by the BS.

[Proposal #2-4] Method of Extending Symbols or Resources Available for SRS Transmission To compensate for the number of times that SRS transmission fails due to LBT failure, the BS may be configured to extend symbols or resources available for SRS transmission. For example, if the maximum number of SRS symbols or resources that the UE is capable of transmitting, which is configured by the BS, is N, the BS may set the number of symbols or resources available for SRS transmission to M (>N). In this case, M–N SRS symbols or resources may be additional resources for providing an SRS transmission opportunity to the UE when the SRS transmission fails due to the LBT failure. If the number of times that the UE fails in the LBT in relation to the SRS transmission is less than M–N, the number of SRS transmission symbols or resources of the UE may still be limited to the maximum number, N. On the other hand, referring to Proposal #2-2, if the number of times that the UE fails in the LBT in relation to the SRS transmission is greater than M–N' (N'>=N), all SRS transmissions on the corresponding SRS resource may be dropped, where the value of N' may be configured by the BS or derived/defined from the value of N.

In the proposal, spatial filters (e.g., SRS symbol indices) applied to SRS symbols or resources transmitted after LBT success may (a) have the same order as the existing spatial filter application order configured by the BS (without consideration of LBT failure) (cyclic extension) (that is, an SRS spatial filter applied when SRS transmission is actually performed is the same as a spatial transmission filter configured to be applied when LBT is successful) or (b) be obtained by delaying the existing spatial filter application order (that is, the order of spatial filters applied to the first transmitted SRS after LBT success is the same as the order of spatial filters that should be applied when LBT is successful). However, in (a), when LBT failure occurs in one or more SRS transmission periods and thus the SRS is transmitted in M–N periods, spatial filters not used for the SRS transmission due to the LBT failure may be configured to be applied sequentially. The examples of (a) cyclic extension and (b) delayed transmission will be described. It is assumed that spatial filters to be applied to time-1 to time-10 (e.g., OFDM/SC-FDMA symbols #1 to 10) are S-1 to S-5 (e.g., SRS symbol indices #1 to 5). That is, time-5 to time-10 correspond to SRS symbols or resources additionally configured by the BS in consideration of the LBT failure of the UE. In this case, if the LBT fails at time-1 and time-2 but succeeds at time-3, the order of spatial filters used for the SRS transmission is (a) S-3, S-4, S-5, S-1, S-2 and (b) S-1, S-2, S-3, S-4, S-5. In both (a) and (b), additional SRS resources at time-8, time-9, and time-10 are released.

[Proposal #2-5] Method of Using Gap between SRS Transmissions

When the NR SRS usage is 'antennaSwitching', a time gap may be required for antenna port switching between consecutive SRS symbols or resources according to the numerology. In a U-band, there may be a disadvantage in that additional LBT is required during the time gap required for antenna port switching while SRS symbols or resources are transmitted. In general, since the time required for antenna port switching is sufficiently short, for example, about 5 usec, no LBT may be performed again during the time gap occupied by the same user after performing the LBT. However, 5 usec may be a relatively large value compared to the duration of an OFDM/SC-FDMA symbol with respect to the CP length and large numerology (SCS) (e.g., 120 kHz, 240 kHz, etc.) of NR. Therefore, if the time gap is required, the BS may configure an SRS time gap between SRS symbols or resources on an OFDM/SC-FDMA symbol basis (i.e., a period including the CP and effective symbol duration based on the numerology). That is, the SRS time gap configured by the BS may be greater than the time gap required for antenna port switching. Since the UE stops signal transmission during the SRS time gap, additional LBT may be required according to the regulation of a wireless system operating in a U-band. Accordingly, even when the SRS is transmitted after the LBT success, no more SRS may be transmitted in subsequent SRS symbols or resources according to the result of the additional LBT performed after the antenna port switching. To solve such a channel occupancy issue, the present disclosure proposes a method of avoiding the additional LBT by transmitting an occupancy signal during the SRS time gap and/or a method of reducing a probability of losing the occupied wireless channel to other users/systems. The proposed method may be generally applied if a time gap is required between consecutive signals during signal transmission after LBT success (for example, if a time gap is required due to a change in the antenna port, panel, BWP during DL signal/channel transmission of the BS). However, for convenience, the present disclosure is described based on the NR SRS usage, 'antenna Switching'.

1. The UE may perform no additional LBT by transmitting an occupancy signal in the SRS time gap period.

2. The period in which the occupancy signal is transmitted may be greater than or equal to "SRS time gap—time required for antenna port switching" configured by the BS (the time gap may not be explicitly given but may be naturally caused by the interval between SRS symbols or resources) and smaller than or equal to an allowed gap (e.g., 16 usec) such that no additional LBT is required. When the time required for antenna port switching is greater than a specific value (e.g., maximum allowed time such that no additional LBT is required) (e.g., 16 usec), the occupancy signal transmission to avoid the additional LBT may not be allowed in the SRS time gap. Further, when the SRS time gap configured by the BS is greater than the specific value, the occupancy signal transmission to avoid the additional LBT may also not be allowed.

3. Here, the occupancy signal may be a signal generated by cyclically extending a signal transmitted immediately before the SRS time gap (for example, the rest of a symbol after the CP thereof may be transmitted immediately after the end of the corresponding symbol in order to maintain the frequency-domain orthogonality of OFDM/SC-FDMA) or cyclically extending the CP of an SRS to be transmitted after the SRS time gap (for example, a signal from a specific part of a symbol to a part preceding by the CP from the last part of the corresponding symbol may be copied and transmitted before the CP of the symbol in order to maintain the frequency-domain orthogonality of OFDM/SC-FDMA).

4. The number of symbols in a period in which the occupancy signal is transmitted or the number of symbols used for cyclic extension may be determined according to the numerology. Even when the cyclic extension is applied over two or more symbols, a signal may be transmitted in the SRS time gap while the frequency-domain orthogonality is maintained as described above. For a specific numerology, the avoidance of the additional LBT based on the occupancy signal may not be allowed. In addition, for a specific numerology (e.g., when the time required for antenna port switching is significantly shorter than the CP length of the numerology), SRS symbols or resources may be continuously transmitted after antenna port switching with no cyclic extension and no additional LBT.

5. The BS may inform the UE whether the cyclic extension is applied. In addition, whether the additional LBT is required due to the cyclic extension may be independently provided by the BS to the UE, or the presence of the additional LBT may be directly determined depending on the application of the cyclic extension.

6. The avoidance of the additional LBT based on the occupancy signal in the SRS time gap period may be implicitly indicated based on the value of the SRS time gap. That is, when the value of an SRS switching gap is indicated as 0 in the corresponding numerology, the UE may be configured to apply the proposal. A symbol or resource in which the SRS is transmitted after antenna port switching may be used to derive an actual SRS resource on the assumption that the switching gap is a specific value.

In the "cyclic extension to maintain the frequency-domain orthogonality of OFDM/SC-FDMA", some SRSs may be dropped in the time domain based on the RE mapping structure of an SRS sequence. For example, if the SRS is mapped in the frequency domain in the form of N combs so that the SRS is repeated in the time domain (that is, a sub-SRS is repeated N times), only some time-domain samples of the SRS transmitted after the LBT may be dropped. However, when the SRS is not repeated in the time domain even once (that is, when every sample included in one sub-SRS is not transmitted once), SRS symbol or resource transmission may be dropped.

To apply the above method, the UE may need to report the time required for antenna port switching and parameters related thereto to the BS. Whether the proposal is applied may be determined based on the report. Further, information about the SRS configuration may be interpreted differently depending on the report.

All proposals related to SRS transmission may be applied in combination unless they are mutually exclusive. In addition, the proposed method may be equally applied even when any signal is transmitted in multiple symbols (e.g., when the BS transmits a specific signal (e.g., CSI-RS) over multiple symbols).

According to the above proposal, the UE may perform LBT for a multi-symbol SRS configured/indicated by the BS sequentially in time. If the LBT fails for the first some SRS symbols (e.g., the first single SRS symbol), the UE may drop the entirety of multi-symbol SRS transmission (see Proposal #2-2). Alternatively, the UE may transmit remaining SRS symbols set later in time, starting from an SRS symbol where the LBT first succeeds in the multi-symbol SRS. Alternatively, when the UE is configured with a symbol window including symbols (N symbols) more than the number of SRS symbols (K) included in the multi-symbol SRS, the UE may perform the LBT for the symbols in the corresponding window sequentially in time and then transmit the multi-symbol SRS from the time when the LBT is first successful (see Proposal #2-4). In this case, each SRS symbol index configured in the multi-symbol SRS may have a structure in which the order is not changed according to the LBT success time (Opt 1) or a structure in which the index order is cyclically shifted according to the LBT result (Opt 2).

For example, the following case may be considered: the number of SRS symbols included in the multi-symbol SRS is 4, the indices thereof are set to SRSs #1 to #4 in time order, the number of symbols included in the symbol window is 8, and the indices thereof are set to symbols #1 to #8. Here, SRS symbols #1 to #4 may mean logical symbol indices on a corresponding SRS resource configuration, and symbols #1 to #8 included in the symbol window may mean logical symbol indices within the corresponding window. For example, SRS symbols #1 to #4 may be configured to be transmitted in actual symbols with indices #k to #(k+3) in a specific slot, and the symbol window may be configured to include actual symbols with indices #k to #(k+7) in the same slot.

In this state, if the UE succeeds in the LBT for symbol #1, the UE may sequentially transmit SRSs #1 to #4 in symbols #1 to #4 in the original order. If the UE fails in the LBT for symbol #1 and succeeds in the LBT for symbol #2, the UE may sequentially transmit SRSs #1 to #4 in symbols #2 to #5 according to Opt 1. On the other hand, the UE may sequentially transmit SRSs #2, #3, #4, #1 in symbols #2 to #5 according to Opt 2 (in a cyclically shifted order). That is, according to Opt 2, SRSs capable of being transmitted in symbols #1 to #8 within the symbol window may be determined as SRSs #1 to #4 and SRSs #1 to #4.

On the other hand, if the number of times that the UE fails in the LBT in relation to the SRS transmission is greater than N−K' (K'>=K), all SRS transmissions on the corresponding SRS resource may be dropped, where the value of K' may be configured by the BS or derived/defined from the value of K.

Section 3: Multi-LBT-SB (Multiple LBT Subband) SRS

If the band of an SRS transmitted by the UE spans multiple LBT-SBs, the UE may not transmit the SRS in all LBT-SBs at a corresponding time or may be allowed to transmit the SRS in some LBT-SBs according to the result of each LBT-SB. If the UE transmits the SRS in some LBT-SBs where LBT is successful, the UE may not perform the LBT in other LBT-SBs at the same time in general. The reason for this is that the LBT may not operate normally due to self-interference between transmission/reception LBT-SBs. The present disclosure proposes a method of increasing the SRS transmission probability of the UE in such an environment. The proposed method will be described based on a case in which the SRS is transmitted in multiple LBT-SBs. However, the proposed method may be equally applied when an arbitrary signal is transmitted over multiple LBT-SBs (for example, when the BS transmits a specific signal (e.g., CSI-RS) over multiple LBT-SBs).

Figure 14:
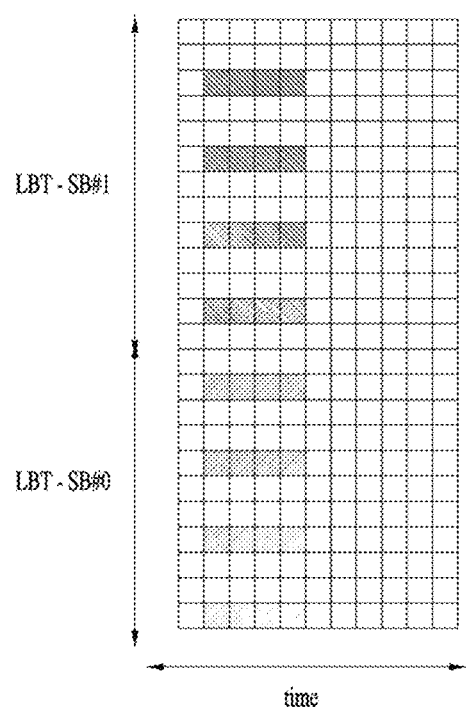

[Proposal #3-1] Method of Transmitting SRS in Multiple LBT-SBs According to SRS Symbol/Resource Configuration and LBT Result The BS may configure SRS symbols/resources over multiple LBT-SBs as shown in FIG. 14 by considering that the UE performs LBT independently for each of the multiple LBT-SBs.

FIG. 14 shows a case where SRS symbols/resources are configured over multiple LBT-SBs on the assumption that SRSs are configured in an interlaced structure. An interlace for SRS transmission may be configured to include two or more consecutive PRBs. In addition, an SRS allocated to multiple LBT-SBs may be a signal composed of one sequence over the multiple LBT-SBs or may have a structure in which an SRS is repeated in each LBT-SB. For example, an SRS of LBT-SB #0 may be the same as an SRS of LBT-SB #1, or an SRS obtained by multiplying the SRS of LBT-SB #0 by a specific phase or code may be transmitted in LBT-SB #1. When an SRS is repeated in each LBT-SB, the index of an interlace in which the SRS is transmitted in each LBT-SB (or the relative position of a PRB in which the SRS is transmitted in each interlace) may vary. In FIG. 14, the hatched area represents a time/frequency resource (e.g., SRS symbol or resource) on which an SRS is capable of being transmitted. In this case, the SRS may or may not be actually transmitted according to the LBT result of the UE.

Spatial filters to be applied to SRS transmission in the hatched areas, i.e., SRS symbols/resources of FIG. 14 may be the same or different in a plurality of SRS symbols/resources spanning multiple LBT-SBs according to the configuration of an SRS resource set. Here, the spatial filter to be applied to the SRS transmission after LBT success may be determined according to the method of adjusting the spatial filter application order proposed in Section 2.

The hatched area, SRS symbol/resource of FIG. 14 may have a structure in which an SRS resource set is configured for a specific LBT-SB and then the SRS resource set is extended to other multiple LBT-SBs. If the UE simultaneously succeeds in LBT in theses multiple LBT-SBs, the spatial filter applied by the UE to the SRS transmission may vary for each LBT-SB.

Figure 15:
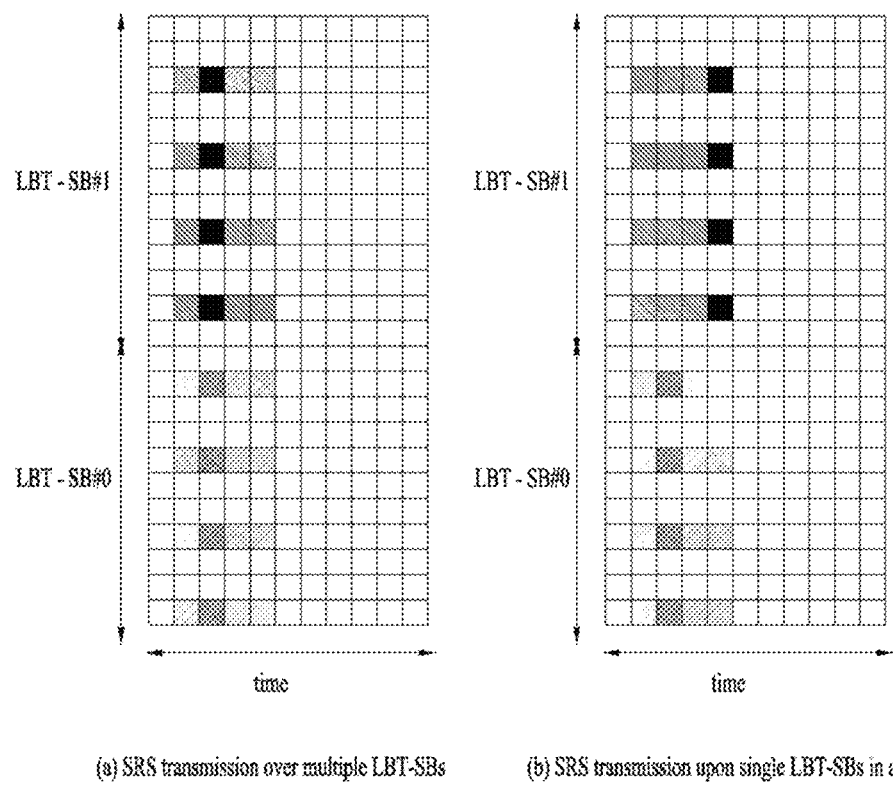

FIG. 15 illustrates that SRSs are transmitted based on results of performing LBT on an LBT-SB basis. Specifically, FIG. 15 (*a*) shows a case in which SRSs are transmitted over multiple LBT-SBs when the LBT is successful in the multiple LBT-SBs. In addition, FIG. 15 (*a*) includes a case in which when the LBT fails in some LBT-SBs among the multiple LBT-SBs, no SRSs are transmitted in any LBT-SB. Specifically, FIG. 15 (*b*) shows a case in which when the LBT is successful in some LBT-SBs among the multiple LBT-SBs, SRSs are transmitted in the corresponding LBT-SBs. In addition, FIG. 15 (*b*) includes a case in which when the LBT is successful in a plurality of LBT-SBs, an SRS symbol/resource is transmitted only in a specific LBT-SB among the plurality of LBT-SBs where the LBT is successful. In this case, the UE may select the LBT-SB to transmit the SRS among the plurality of LBT-SBs where the LBT is successful according to the following methods.

The LBT-SB may be randomly selected by the UE,

The LBT-SB may be selected based on priorities indicated by the BS, or

The LBT-SB may be derived from previous SRS symbol/resource transmission statistics.

Parameters for selecting the LBT-SB to transmit the SRS from among the plurality of LBT-SBs where the LBT is successful may be derived based on the following.

Statistics on LBT success of each LBT-SB

Channel quality for each LBT-SB (statistics of data transmission/reception success probability (ACK/NACK))

The number of SRS symbols/resources to be transmitted for each LBT-SB

In FIG. 15 (*b*), if the LBT is successful for SRSs to be transmitted at the same time (e.g., symbol) in multiple LBT-SBs, SRS transmission may be allowed in all LBT-SBs where the LBT is successful (or in some LBT-SB if there are transmission power restrictions).

[Proposal #3-2] Method of Performing SRS Transmission and Securing LBT Time Gap in Multiple LBT-SBs When the BS configures SRS symbols/resources over multiple LBT-SBs as shown in FIG. 14 by considering that the UE performs LBT independently for each of the multiple LBT-SBs, the UE may perform the LBT over several hours for each LBT-SB, thereby improving the SRS transmission probability. In this case, when the LBT is successful only in a specific LBT-SB, the UE may transmit the SRS only in the corresponding LBT-SB as shown in FIG. 15 (*b*). Thereafter, the UE may transmit SRSs by performing the LBT in other LBT-SBs. This is related to the following procedures and features.

1. The UE may perform the LBT for each LBT-SB and transmit the SRS first in an LBT-SB where the LBT is successful (hereinafter, LBT-SB #i).

2. An SRS symbol/resource remaining after transmitting the SRS in LBT-SB #i may be excluded from candidate SRS transmission resources, and the UE may perform no LBT for SRS transmission during the corresponding period (e.g., a slot). However, if the SRS symbol/resource is configured to be repeatedly transmitted in LBT-SB #i, LBT-SB #i is not excluded from candidate SRS transmission resources until the repeated SRS repeated transmission ends.

3. The UE may perform the LBT for the remaining LBT-SB(s) except for the LBT-SB in which the SRS is transmitted (i.e., LBT-SB #i).

4. An LBT time gap may operate immediately after the SRS transmission. If the time gap exists until the symbol boundary of a next SRS transmission resource after the LBT is successful in the LBT-SB, the proposals for transmitting an occupancy signal during an SRS time gap may be applied to prevent other users from taking the channel occupancy (see Section 2).

5. When the SRS is transmitted in the LBT-SB where the LBT is successful, a spatial filter used for the SRS transmission may be configured independently for each LBT-SB.

6. A spatial filter for SRS transmission in s2 (e.g., the third symbol in the slot) of LTE-SB #0 and a spatial filter for SRS transmission in s4 (e.g., the fifth symbol in the slot) of LBT-SB #1 may be managed separately, which may follow the configuration of an SRS resource set of each LBT-SB.

7. When the amount of resources given as candidate SRS transmission resources is more than the amount of resources required for SRS transmission, if all reserved SRS transmissions are completed before exhaustion of the candidate SRS transmission resources, all candidate SRS transmission resources in subsequent periods are released.

8. The UE may report to the BS information on the multiple LBT-SBs in which SRSs are actually transmitted.

9. The BS may misidentify a time/frequency resource (e.g., SRS symbol/resource and LBT-SB) on which the UE transmits the SRS. For example, the BS may misunderstand whether the UE transmits the SRS or the SRS is not detected due to poor spatial characteristics of the SRS. In addition, the BS may not know exactly information on the spatial filter used for the SRS transmission. Therefore, the UE may report to the BS the information about the multiple LBT-SBs (information about LBT-SBs in which the SRS is transmitted, information about symbols/resources in which the SRS is transmitted in each LBT-SB, and/or information about the spatial filter of the corresponding SRS). The information about the multiple LBT-SBs used for the SRS transmission may be included in some information of the parameter related to sequence generation and reported during the SRS transmission as described in Section 1. Alternatively, the information may be reported by a PUCCH/PUSCH.

10. The information about the multiple LBT-SBs used for the SRS transmission may be reported as follows: (1) only SRS LBT-SBs in which the SRS is transmitted may be reported in the form of a bitmap, that is, as 0 and 1; (2) information on time resources on which the SRS is transmitted may be reported in the form of a bitmap, that is, as 0 and 1; or (3) information on time/frequency resources on which the SRS is transmitted may be reported by a bitmap or by a table including integer values. Methods (1) to (3) may be selectively applied depending on whether SRSs are simultaneously transmitted in the multiple LBT-SBs or whether the spatial filter used for the SRS transmission varies for each LBT-SB.

11. The SRS symbol/resource configuration may be changed based on the information on the multiple LBT-SBs in which the SRS is transmitted.

12. The BS may change the SRS resource set of the UE and the configuration of the multiple LBT-SBs based on the information on the multiple LBT-SBs in which the SRS is transmitted. The UE may reflect the corresponding information in next SRS transmission. If the UE does not report the information about the multiple LBT-SBs in which the SRS is actually transmitted to the BS, the UE may adjust the spatial filter for the SRS transmission based on corresponding information in a next SRS transmission period (and interval).

According to the above proposal, frequency hopping operation may be configured/instructed for SRS transmission over a plurality of LBT-SBs on an LBT-SB basis, and a CCA gap for LBT may be configured between hopping target LBT-SBs. For example, an SRS hopping target LBT-SB group may consist of LBT-SBs #1 to #N, and SRS transmission hopping may be performed sequentially according to the index order. In this case, SRS symbols and CCA gaps may be TDMed in the following time order: CCA gap for LBT-SB #1=>SRS symbol for LBT-SB #1=>CCA gap for LBT-SB #2=>SRS symbol for LBT-SB #2=> . . . this case, whether the SRS is transmitted in each LBT-SB may be determined according to the LBT (CCA) result for the corresponding LBT-SB. For example, if it is determined by the CCA gap for LBT-SB #X that the channel state in LBT-SB #X is idle, the UE may perform transmission in the SRS symbol for LBT-SB #X. If the channel state is busy, the UE may be configured to drop/discard transmission in the SRS symbol for LBT-SB #X (for convenience, referred to as "SRS hopping method 1").

As another example, an SRS hopping target LBT-SB group may consist of LBT-SB #1 to #N, and no LBT-SB index order may be specified for SRS transmission hopping. In this case, SRS symbols and CCA gaps may be TDMed with no LBT-SB index indication in the following time order: CCA gap #1=>SRS symbol #2=>CCA gap #2=>SRS symbol #2=> . . . . The UE may perform LBT for a plurality of LBT-SBs in the LBT-SB group during first CCA gap #1. The UE may select one specific LBT-SB where the LBT is successful, i.e., LBT-SB #X and transmit an SRS in the corresponding LBT-SB in SRS symbol #1. Thereafter, the UE may perform the LBT only for the remaining LBT-SBs except LBT-SB #X during next CCA gap #2. Thereafter, the UE may select a specific LBT-SB where the LBT is successful, i.e., LBT-SB #Y among the plurality of LBT-SBs except for LBT-SB #X and transmit the SRS in the corresponding LBT-SB in next SRS symbol #2. Thereafter, the UE may perform the LBT only for the remaining LBT-SBs except for LBT-SB #Y during the next CCA gap (for convenience, referred to as "SRS hopping method 2").

Additionally, it may be considered that SRS hopping is performed between a plurality of LBT-SBs over a plurality of symbols by combining an LBT-SB group and a symbol window. In this case, the number of periods included in the symbol window, that is, the number of {CCA gap+SRS symbol} periods obtained by combining CCA gaps and SRS symbols related thereto (included in the corresponding window) may be greater than the number of LBT-SBs in the LBT-SB group, N. According to SRS hopping method 1, the SRS hopping order configured between LBT-SB indices in the LBT-SB group may not be changed (as in Opt 1 of Proposal #2-5). However, the index order may be cyclically shifted according to the LBT result (as in Opt 2 of Proposal #2-5).

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 16:
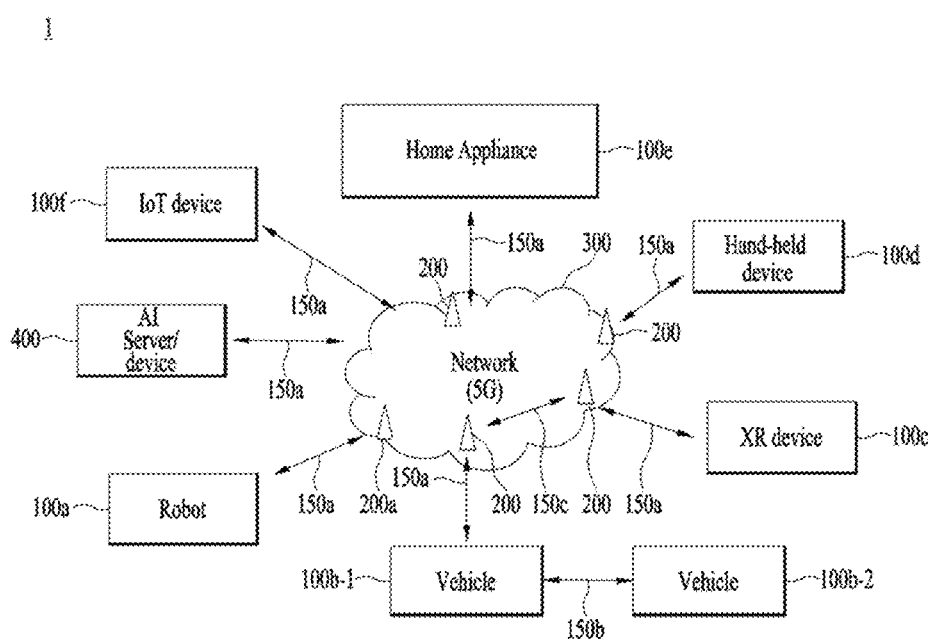
FIGS. 16 to 19 illustrate a communication system 1 and wireless devices, which are applied to the present disclosure.

FIG. 16 illustrates a communication system 1 applied to the present disclosure.

Referring to FIG. 16, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smart glasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 17:
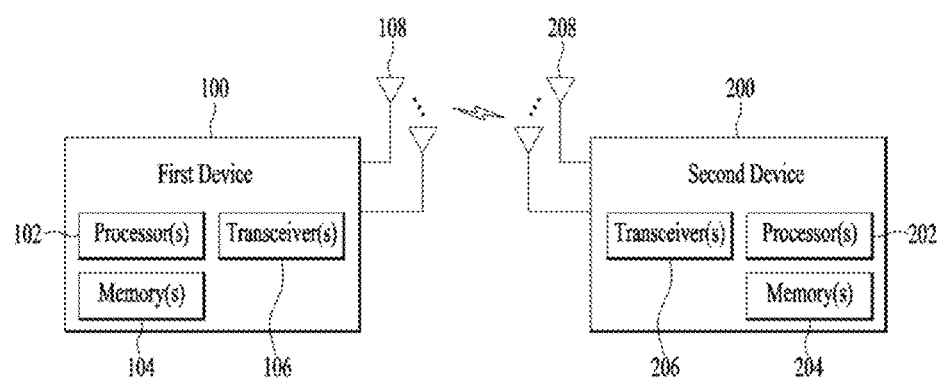

FIG. 17 illustrates wireless devices applicable to the present disclosure.

Referring to FIG. 17, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals.

To this end, the one or more transceivers 106 and 206 may include (analog) oscillators and/or filters.

Figure 18:
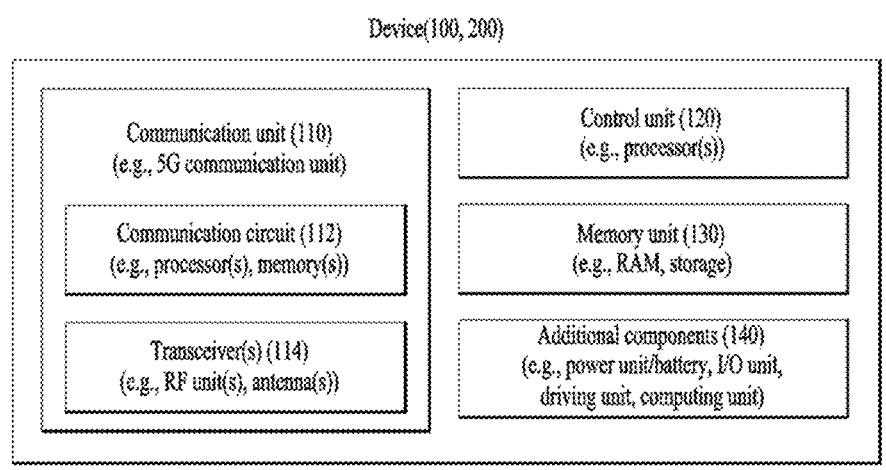

FIG. 18 illustrates another example of a wireless device applied to the present disclosure. The wireless device may be implemented in various forms according to a use case/service (refer to FIG. 16).

Referring to FIG. 18, wireless devices 100 and 200 may correspond to the wireless devices 100 and 200 of FIG. 16 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 16), the vehicles (100b-1 and 100b-2 of FIG. 16), the XR device (100c of FIG. 16), the hand-held device (100d of FIG. 16), the home appliance (100e of FIG. 16), the IoT device (100f of FIG. 16), a digital broadcasting terminal, a hologram device, a public safety device, an MTC device, a medical device, a FinTech device (or a finance device), a security device, a climate/environment device, the AI server/device (400 of FIG. 16), the BSs (200 of FIG. 16), a network node, or the like. The wireless device may be mobile or fixed according to a use case/service.

In FIG. 18, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 19:
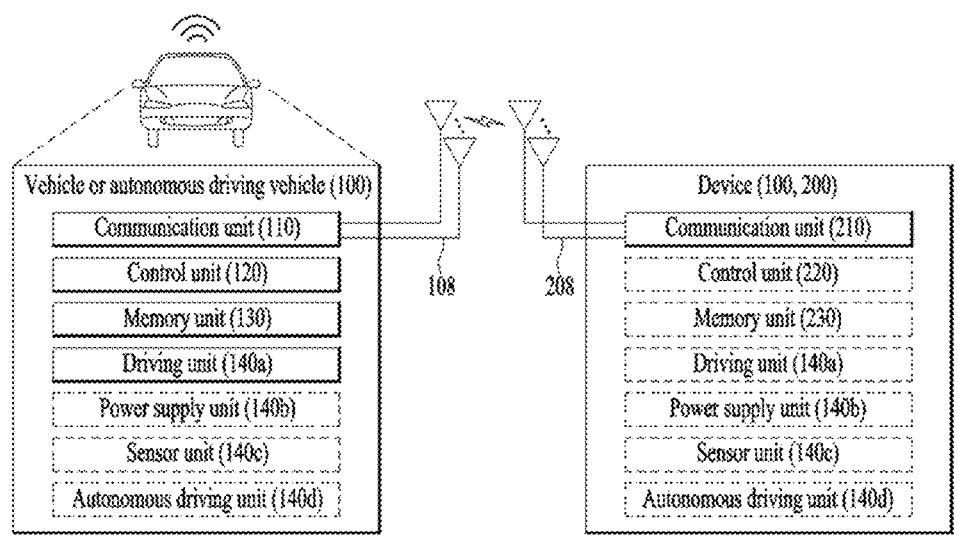

FIG. 19 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 19, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

The embodiments of the present disclosure have been described above, focusing on the signal transmission and reception relationship between a UE and a BS. The signal transmission and reception relationship is extended to signal transmission and reception between a UE and a relay or between a BS and a relay in the same manner or a similar manner. A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term fixed station, Node B, enhanced Node B (eNode B or eNB), access point, and so on. Further, the term UE may be replaced with the term terminal, mobile station (MS), mobile subscriber station (MSS), and so on.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure may be used for a UE, a BS, or other equipment in a wireless mobile communication system.

The invention claimed is:

1. A method of controlling uplink transmission by a user equipment (UE) in a wireless communication system, the method comprising:
   receiving sounding reference signal (SRS) configuration information;
   performing a clear access procedure (CAP) for SRS transmission for each symbol based on the SRS configuration information, starting from a first symbol among a plurality of symbols; and
   performing an SRS transmission process based on success of the CAP in an M-th symbol among the plurality of symbols,
   wherein based on that M is less than or equal to a reference value, the SRS transmission is performed in the M-th symbol among the plurality of symbols,
   wherein based on that M is greater than the reference value, the SRS transmission is dropped in all symbols after the M-th symbol among the plurality of symbols, and
   wherein an SRS index corresponding to the SRS transmission in the M-th symbol has an index value obtained by indexing from the M-th symbol among the plurality of symbols.

2. The method of claim 1, wherein the SRS configuration information includes first information about a number of SRS symbols K, and wherein the reference value is determined based on the first information.

3. The method of claim 2, wherein based on that a number of the symbols after the M-th symbol is greater than the number of the SRS symbols, the SRS transmission is performed only in a maximum of K symbols among the symbols after the M-th symbol among the plurality of symbols.

4. A user equipment (UE) for use in a wireless communication system, the UE comprising:
   at least one processor; and
   at least one computer memory operably connected to the at least one processor and configured to store instructions that, when executed, cause the at least one processor to perform operations comprising:
   receiving sounding reference signal (SRS) configuration information;
   performing a clear access procedure (CAP) for SRS transmission for each symbol based on the SRS configuration information, starting from a first symbol among a plurality of symbols; and
   performing an SRS transmission process based on success of the CAP in an M-th symbol among the plurality of symbols,
   wherein based on that M is less than or equal to a reference value, the SRS transmission is performed in the M-th symbol among the plurality of symbols,
   wherein based on that M is greater than the reference value, the SRS transmission is dropped in all symbols after the M-th symbol among the plurality of symbols, and
   wherein an SRS index corresponding to the SRS transmission in the M-th symbol has an index value obtained by indexing from the M-th symbol among the plurality of symbols.

5. The UE of claim 4, wherein the SRS configuration information includes first information about a number of SRS symbols K, and wherein the reference value is determined based on the first information.

6. The UE of claim 5, wherein based on that a number of the symbols after the M-th symbol is greater than the number of the SRS symbols, the SRS transmission is performed only in a maximum of K symbols among the symbols after the M-th symbol among the plurality of symbols.

7. A device for a user equipment (UE), the device comprising:
   at least one processor; and
   at least one computer memory operably connected to the at least one processor and configured to store instructions that, when executed, cause the at least one processor to perform operations comprising:
   receiving sounding reference signal (SRS) configuration information;
   performing a clear access procedure (CAP) for SRS transmission for each symbol based on the SRS configuration information, starting from a first symbol among a plurality of symbols; and
   performing an SRS transmission process based on success of the CAP in an M-th symbol among the plurality of symbols,
   wherein based on that M is less than or equal to a reference value, the SRS transmission is performed in the M-th symbol among the plurality of symbols,
   wherein based on that M is greater than the reference value, the SRS transmission is dropped in all symbols after the M-th symbol among the plurality of symbols,
   wherein an SRS index corresponding to the SRS transmission in the M-th symbol has an index value obtained by indexing from the M-th symbol among the plurality of symbols.

8. The device of claim 7, wherein the SRS configuration information includes first information about a number of SRS symbols K, and wherein the reference value is determined based on the first information.

9. The device of claim 8, wherein based on that a number of the symbols after the M-th symbol is greater than the number of the SRS symbols, the SRS transmission is performed only in a maximum of K symbols among the symbols after the M-th symbol among the plurality of symbols.

* * * * *